Jan. 20, 1970  G. B. SEABORN, JR  3,491,293
WIDE-RANGE MEGOHMMETER HAVING AN F.E.T. RESPONSIVE TO
RAPID CHANGES IN MEASURED RESISTANCE VALUES
Filed May 2, 1968
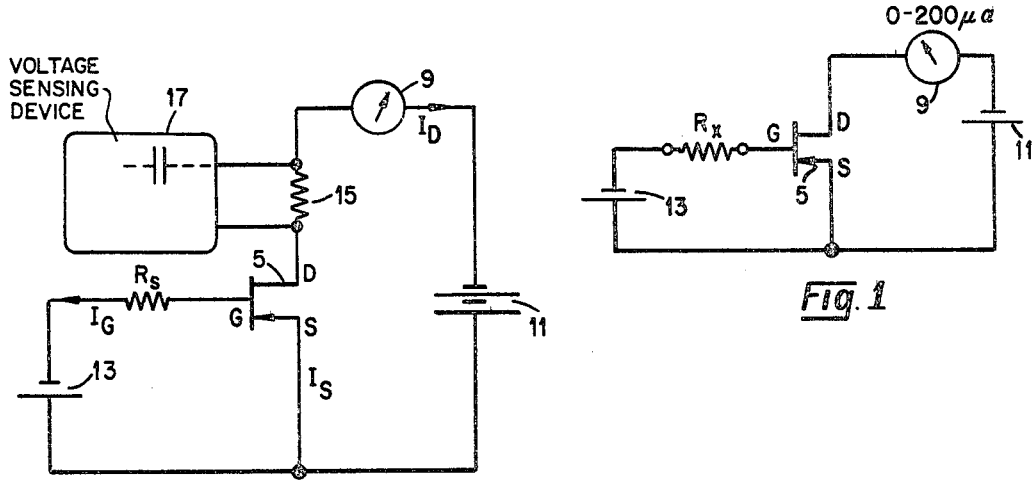
Fig.1
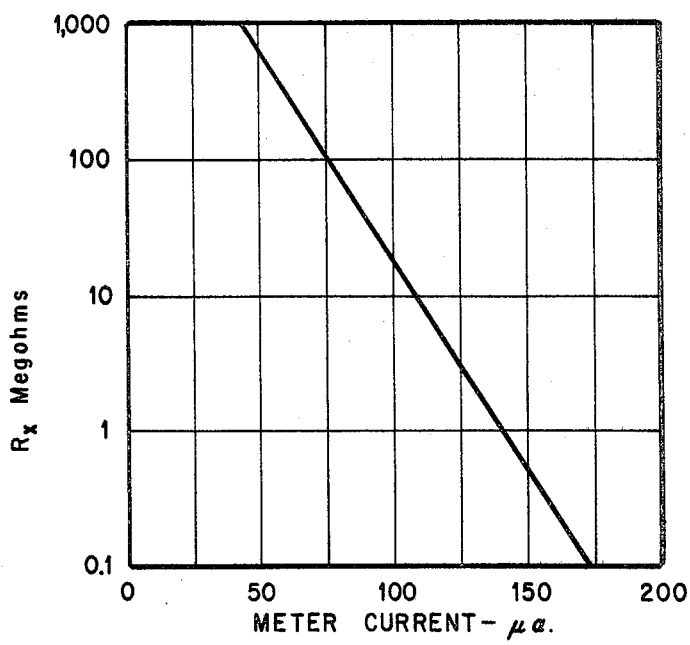
Fig.2
Fig.3
INVENTOR.
Garland B. Seaborn Jr.
BY
ATTORNEY.

United States Patent Office 3,491,293
Patented Jan. 20, 1970

3,491,293
WIDE-RANGE MEGOHMMETER HAVING AN F.E.T. RESPONSIVE TO RAPID CHANGES IN MEASURED RESISTANCE VALUES
Garland B. Seaborn, Jr., Oak Ridge, Tenn., assignor to the United States of America as represented by the United States Atomic Energy Commission
Filed May 2, 1968, Ser. No. 726,007
Int. Cl. G01r 27/02
U.S. Cl. 324—62                    1 Claim

ABSTRACT OF THE DISCLOSURE

An extremely simple but wide-range megohmmeter. The circuit takes advantage of the input gate current-versus-drain current characteristic of certain commercially available field-effect transistors. An unknown resistance in the range of 0.1 to 1,000 megohms connected in the base lead of the field-effect transistor allows a current to flow in the drain lead of the transistor which varies logarithmically with the value of the unknown resistance. Thus, an ammeter connected in the drain lead circuit can be calibrated to read out the resistance value over this entire megohm range.

Background of the invention

This invention was made during the course of, or under, a contract with the U.S. Atomic Energy Commission.

This invention relates to megohmmeters and more specifically to a very simple wide-range megohmmeter.

There are many applications where it is desirable to employ an inexpensive compact megohmmeter in a permanent installation or in compact instruments, for example, where the cost and size of conventional ohmmeters would prohibit their use.

Certain sensors for radiation, smoke, etc., have elements which react by exhibiting a change in the resistance of a sensing element when exposed to an atmosphere containing the products being sensed. These sensors have a very high initial resistance which varies in the megohm range and when exposed undergo a marked drop in resistance. Thus, it is desirous to have a resistance sensing circuit which can be produced in quantity for use with sensors of the kind described and which will respond to any large and rapid change in the initial resistance in order to actuate an indicator or alarm.

Therefore, it is a primary object of this invention to provide a very simple, inexpensive wide-range megohmmeter which will respond to rapid changes in resistance values.

Summary of the invention

Briefly, in view of the above-mentioned object, the present invention calls for a specific commercially available field-effect transistor whose drain current varies logarithmically with the value of the unknown resistance connected in series with the gate lead of the transistor. An appropriately calibrated ammeter is connected in the drain lead of the transistor to read out the resistance value directly.

Other objects and many of the attendant advantages of the present invention will become evident from the following description when taken in conjunction with the accompanying drawings.

Brief description of the drawings

FIG. 1 is a schematic diagram of a wide-range megohmmeter according to the present invention;

FIG. 2 is a schematic diagram of an alternative embodiment of the ohmmeter of FIG. 1; and FIG. 3 is a curve showing the drain-current-versus unknown resistance response of the field-effect transistor of FIGS. 1 and 2.

Description of the preferred embodiments

Referring now to FIG. 1, a resistor $R_x$ having a high but unknown ohmic value is connected in series with the gate electrode G of a particular commercially available field-effect transistor 5. The characteristics of the transistor are such that the drain electrode current varies logarithmically with the value of $R_x$ connected in the gate electrode. The drain electrode is connected to one terminal of a calibrated ammeter 9. The other terminal of the ammeter is connected to the negative terminal of a unidirectional bias voltage source 11. The positive terminal of the source 11 is connected to the source electrode S of transistor 5. To complete the circuit a second unidirectional voltage source 13 is connected between the unconnected terminal of resistor $R_x$ and the source electrode S of transistor 5 with the positive terminal connected to the source electrode.

The operation of the megohmmeter may be best understood by referring to FIG. 3. FIG. 3 shows the characteristic of a 2N2841 transistor which is one filed-effect transistor known to work very well in the circuit. As shown, the drain current which flows through ammeter 9 varies logarithmically with the value of $R_x$ over the range from about 0.1 megohm to 1,000 megohms. Thus, the meter read-out can be a true log scale over this entire range and can be calibrated to read directly in megohms.

Referring now to FIG. 2, there is shown an alternate embodiment of the megohmmeter which can be used to sense rapid changes in resistance of, for example, a resistance device such as a radiation sensor $R_s$ connected to the gate electrode. The circuit differs from that of FIG. 1 in that a resistor 15 is connected in series with the drain electrode D of transistor 5. Connected across the resistor 15 is a circuit 17 adapted to sense voltage changes across the resistor 15. The circuit 17 may include a capacitor whose value is selected so that only rapid changes in the voltage across the resistor 15 are detected by circuit 17. Thus, the output of circuit 17 could be used to operate an alarm or indicator when the sensor $R_s$ is exposed, causing a marked change in the resistance of the sensor.

Thus, it will be seen that a very simple and inexpensive megohmmeter has been provided which is extremely accurate over a wide range of resistance values and will respond rapidly to sudden changes in resistance values being measured.

What is claimed is:

1. A wide-range megohmmeter responsive to rapid changes in measured resistance comprising: a field effect transistor having a gate, drain and source electrode, said transistor being of the type whose drain-current varies logarithmically with the gate electrode input current; a resistive sensing element having an initial resistance in the megohm range which undergoes a marked reduction in resistance upon exposure to a detectable medium, said resistance element being connected in series with said gate electrode of said transistor; a first unidirectional bias voltage source connected between said resistive sensing element and said source electrode of said transistor; a second unidirectional bias voltage source; means for sensing the current of said drain electrode to provide an indication of the resistive value of said sensing element; a series circuit including a resistor, said current sensing means and said second unidirectional bias voltage source connected between said drain and source electrode of said transistor; and a voltage sensing device connected across said resistor of said series connected circuit, including a series connected capacitor at one terminal of said resistor for sensing only rapid changes in voltage across said resistor thereby indicating marked changes in resistance of said resistive sensing element.

References Cited

UNITED STATES PATENTS

| | | |
|---|---|---|
| 2,510,691 | 6/1950 | Gilbert. |
| 3,284,707 | 11/1966 | Clinton. |
| 3,320,524 | 5/1967 | Miller _____ 324—54 |
| 3,328,685 | 6/1967 | Hewlett. |

OTHER REFERENCES

Gardner, Louis E., Jr., Meet Mr. FET . . . The Transistor That Thinks It's a Tube, Popular Electronics, February 1967, pp. 47–53, 94, TK 7800.P6.

EDWARD E. KUBASIEWICZ, Primary Examiner

U.S. Cl. X.R.

307—304